United States Patent
Mühlthaler et al.

(10) Patent No.: US 7,967,249 B2
(45) Date of Patent: Jun. 28, 2011

(54) COOLING SYSTEM AND METHOD FOR EXPELLING HEAT FROM A HEAT SOURCE LOCATED IN THE INTERIOR OF AN AIRCRAFT

(75) Inventors: Georg Mühlthaler, Hamburg (DE); Michael Markwart, Halstenbek (DE); Andreas Edom, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 218 days.

(21) Appl. No.: 10/581,328

(22) PCT Filed: Dec. 30, 2004

(86) PCT No.: PCT/EP2004/014860
§ 371 (c)(1),
(2), (4) Date: Jun. 1, 2006

(87) PCT Pub. No.: WO2005/063566
PCT Pub. Date: Jul. 14, 2005

(65) Prior Publication Data
US 2007/0095521 A1   May 3, 2007

(30) Foreign Application Priority Data

Dec. 30, 2003  (DE) .................................. 103-61-653

(51) Int. Cl.
 *B64D 13/08* (2006.01)
 *B64D 11/00* (2006.01)
(52) U.S. Cl. .................... 244/118.5; 244/57; 244/117 A
(58) Field of Classification Search ............... 244/117 A, 244/119, 118.1, 118.5, 171.8, 57, 59; 165/202; 62/DIG. 5
See application file for complete search history.

(56) References Cited

U.S. PATENT DOCUMENTS

| | | | | |
|---|---|---|---|---|
| 2,499,736 A | * | 3/1950 | Kleen | |
| 3,929,305 A | * | 12/1975 | Sabol | 244/117 A |
| 4,000,776 A | * | 1/1977 | Kroebig et al. | 165/272 |
| 4,044,396 A | * | 8/1977 | Haws et al. | 361/698 |
| 4,057,104 A | | 11/1977 | Altoz | |
| 4,786,015 A | * | 11/1988 | Niggemann | 244/117 A |
| 5,267,608 A | | 12/1993 | Coffinberry | |
| 5,513,500 A | * | 5/1996 | Fischer et al. | 62/239 |
| 5,702,073 A | * | 12/1997 | Fluegel | 244/57 |

(Continued)

FOREIGN PATENT DOCUMENTS

| | | |
|---|---|---|
| DE | 3812739 C1 | 7/1989 |
| EP | 0655593 | 5/1995 |
| GB | 1526160 | 9/1978 |
| GB | 1526160 A * | 9/1978 |
| GB | 1595961 | 8/1981 |
| GB | 1595961 A * | 8/1981 |
| NO | 320664 B1 * | 12/2001 |

*Primary Examiner* — Tien Dinh
*Assistant Examiner* — Richard R Green
(74) *Attorney, Agent, or Firm* — Wood, Herron & Evans, L.L.P.

(57) ABSTRACT

With a cooling system for expelling heat from a heat source (30) located in the interior of an aircraft to a heat reducer (32), with a piping system (10) sealed against the surrounding atmosphere which is thermally coupled to a heat intake section (14) with the heat source (38) and to a heat output section (22) with the heat reducer (32), and which preferably has an essentially adiabate transport section (21), it is proposed that the piping system (10) is filled with a heat conveyance medium (12) which, when taking in heat from the heat source (38) in the heat intake section (14) undergoes a transition from the liquid phase to the gaseous phase, then flows into the heat output section (22), and here, when discharging heat to the heat reducer (32) condenses once again, and flows back into the heat intake section (14).

5 Claims, 4 Drawing Sheets

U.S. PATENT DOCUMENTS

| | | | |
|---|---|---|---|
| 5,966,951 A * | 10/1999 | Hallin et al. | 62/141 |
| 6,220,338 B1 | 4/2001 | Grandi | |
| 6,435,454 B1 | 8/2002 | Engelhardt | |
| 6,481,228 B1 * | 11/2002 | Chiang et al. | 62/223 |
| 6,658,881 B1 * | 12/2003 | Plattner | 62/239 |
| 2005/0103487 A1 * | 5/2005 | Aflekt et al. | 165/202 |

* cited by examiner

COOLING SYSTEM AND METHOD FOR EXPELLING HEAT FROM A HEAT SOURCE LOCATED IN THE INTERIOR OF AN AIRCRAFT

This invention relates to a cooling system for expelling heat from a heat source located in the interior of an aircraft to a heat sink or heat reducer.

In aircrafts, particularly in commercial aircrafts, there are a number of electronic devices and other functional units which give off heat during operation of the aircraft. For example, in the aircraft's on-board kitchen (galley) the food and drinks it provides must be cooled so that these remain enjoyable over a sufficiently long period of time. Moreover, within the aircraft there are a number of computer units from which large quantities of heat must also be expelled during operation so as to be able to guarantee reliable function.

In order to provide the aforementioned cooling functions, one has come up with various ideas in the past. For example, DE 38 12 739 shows a cooling system for a cooling chamber in an aircraft. With this cooling system it is proposed to convey air from a cold air chamber by means of a ventilator into a cooling chamber where a service trolley which is to be cooled is located. From the cooling chamber, partially heated air is conveyed back into the cold air chamber where this can cool down again. The cold air chamber is kept cool by the fact that it is in direct contact with a non-insulated section of the aircraft outer skin, and so during the aircraft's flight operation, in which temperatures of $-50°$ C. generally prevail on the aircraft outer skin at normal flight altitudes, the cold air chamber can be cooled effectively as a result of the thermal coupling by means of the non-insulated aircraft outer skin with the surroundings. The disadvantage of this system, however, is that the cooling chamber must be located near to the outer skin of the aircraft, and this restricts flexible interior arrangement of the aircraft. Moreover, the level of efficacy of this system is relatively low because only the perceptible heat from the air used as a heat conveyor medium can be used for heat conveyance. Finally, there is another disadvantage of this system, in that a special unit is required for the conveyance of the heat conveyance medium which causes additional parasitic heat damage.

It can generally be seen that there are considerable disadvantages with using air as a heat conveyance medium. In particular, air has relatively low specific heat conveyance performance. Moreover, a relatively large amount of space is necessary for the required piping system which can lead to additional weight and also to additional problems relating to leakage and noise. Because of the low specific heat conveyance performance, a correspondingly high conveyance performance is required which can lead to the aforementioned parasitic heat damage. Another important disadvantage of using air as a heat conveyance medium is that the waste air from the cooling of heat sources, the electronic devices for example, is usually expelled from the pressure cabin because of its heat and/or pollution, and can not be re-circulated. Because of the balance of air in the aircraft, such quantities of waste air should, however, be limited as far as possible.

As an alternative to the use of air as a heat conveyance medium there are other solutions with which liquids are used as a heat conveyance medium. The disadvantage of these, however, is their relatively high weight. Moreover, pumps are required in order to convey the liquid heat conveyance medium which, on the one hand, leads to increased weight, and on the other hand to parasitic heat damage, and so reduce the efficacy level of the cooling unit. Finally, this type of cooling system is relatively expensive to maintain.

U.S. Pat. No. 6,435,454, however, shows a system whereby the outer skin of a supersonic jet aircraft is cooled by means of cooling systems. With this system excessive heating of the outer skin of the aircraft caused by air friction is prevented so as to minimize the emission of infra-red radiation and thus reduce identification of the aircraft with infra-red detectors. Contrary to the current state of technology described above, with this system the heat from the outer skin of the aircraft is conveyed into the aircraft interior and there, for example, used to heat the fuel with the aim of efficient combustion.

It is the aim of this invention to provide a cooling system and a method of the type indicated at the outset, which in relation to the current state of technology, allows heightened specific heat transfer performance with low technical cost.

This problem is solved by a cooling system which expels heat from a heat source located in the interior of an aircraft to a heat sink or heat reducer, whereby the cooling system has a piping system which is sealed against the surrounding atmosphere, which is thermally coupled with a heat intake section with the heat source and a heat output section with the heat reducer, and which has a conveyance section with is preferably essentially adiabatic, whereby the piping system is filled with a heater conveyance medium which, when heat is taken in from the heat source in the heat intake section, undergoes the transition from the liquid phase to the gaseous phase, then flows into the heat output section and there, when heat is discharged to the heat reducer, it condenses again and flows back into the heat input section.

With the cooling system in accordance with the invention, in particular the latent heat of the heat conveyance medium can be used, ie. the heat which at the phase transition from the liquid phase to the gaseous phase is taken in from the heat conveyance medium and at a later phase transition in the heat output section is given out from the gaseous phase back to a condensate, ie. back to the liquid phase. In this way the specific heat transfer performance of the cooling system in accordance with the invention is considerably heightened in relation to conventional systems established by the current state of technology, for example DE 38 12 739, where air is used as a heat conveyance medium and only the perceptible heat of the same can be used for cooling.

Moreover, the cooling system in accordance with the invention has the additional advantage that it provides a closed system, whereby heat transfers take place via the walls of the piping system without there being any direct contact of the heat conveyance medium with external components. In this way, impurities of the heat conveyance medium and undesirable moisture penetration into the heat conveyance medium circuit can be prevented. In addition, in relation to systems with permanent liquid heat conveyance media, the cooling system in accordance with the invention has the advantages of lower weight and also the use both of the perceptible and the latent heat for heat conveyance. Another advantage of the invention is that there is no requirement for conveyance devices, such as for example, pumps in order to set the circulation in motion. Also by means of the closed circuit, undesirable condensation effects can be prevented which can otherwise, as for example with the system in accordance with DE 38 12 739, occur at points within the aircraft and lead to undesirable icing or even corrosion of these sections of the aircraft. These undesirable condensation effects arise with the current state of technology because, for example, air from the on-board kitchen (galley) is used for the conveyance of heat. In this way, ambient air humidity comes about, and this leads to the aforementioned undesirable condensation effects on the outer skin of the aircraft.

A further development of the invention proposes that the piping system includes a closed pipe of which one end section is the heat intake section, and of which the other end section is the heat output section, whereby the two end sections are connected to one another by the conveyance section. The closed pipe can be of any shape or form and so has a relatively high level of flexibility with regard to the use and arrangement of the devices requiring cooling in the aircraft interior. With a variation of the invention, the closed pipe is made from a flexible material and is of a flexible structure, if required with articulation, in order to create further levels of freedom for installation.

In accordance with the invention, it is also proposed that the heat source includes at least one component of an electronic device in the aircraft, of an on-board kitchen in the aircraft, an inner surface of the aircraft which requires cooling, or similar. With another development of the invention, a section of an external wall of the aircraft, preferably non-insulated or sufficiently well thermally coupled, a section of the aircraft structure, for example a transverse, the floor framework or the ceiling framework, a section of an aircraft bilge or an air channel, in particular of a ram air channel, can be used as a heat reducer or heat sink.

In order to further raise the efficacy level of the cooling system, a variation of the invention proposes that the heat transfer in the heat intake section and/or in the heat output section is realised by means of a heat exchanger which couples the heat source or the heat reducer/heat sink with the piping system. Controllable heat exchangers are preferably used, for example heat exchangers with variable air volume flow, in order to be able to operate the cooling system in accordance with the invention to meet with the different requirements of the devices to be cooled, for example dependent upon loading. With a variation of the cooling system in accordance with the invention, for example, a ventilator can be assigned to the respective heat exchanger by means of which the heat transfer between the heat exchanger and the heat source is controllable. The revolutions per minute of the ventilator is controlled here so that there is stronger or less strong air circulation around the heat source, according to the requirement, and so there is a greater or less great heat flow—dependent upon the ventilator's revolutions per minute—in the heat exchanger.

An alternative realisation of a load-dependent setting of the cooling system in accordance with the invention is possible with the invention in that the flow of the heat conveyance medium between the heat intake section and the heat output section is controllable. For example, the flow cross-sections of the cooling system between the heat intake section and the heat output section can be adjusted dependent upon loading. For this, it can be, for example, that the cooling system is provided with a regulator valve by means of which the quantity of heat conveyance medium flowing to and from the heat exchanger can be controlled.

When "controllability" or "control" is mentioned within the framework of this description, this includes, on the one hand, control in accordance with the specified models or reference lines, and on the other hand the case of regulation, ie. control using feedback.

Different parameters can be established for the control or regulation. In particular, it is proposed in accordance with the invention, that a temperature sensor is positioned close to the heat source, whereby the cooling system can be controlled with reference to the temperature recorded by the temperature sensor. In addition, in connection with this it can be that the ventilator and/or the regulator valve is controlled based upon the temperature recorded by the temperature sensor. With regard to the aforementioned regulation, a further development of the invention proposes that a regulation system is provided which controls the ventilator and/or the regulator valve in accordance with the temperature recorded by the temperature sensor.

A further development of the invention proposes that a cold storage unit is provided between the heat source and the heat sink. By using cold storage units, sufficient cooling can be guaranteed when, for example, the aircraft is on the ground and because of the high external temperature it is not possible to provide cooling via the outer skin of the aircraft.

As an alternative to the arrangement of the cold storage unit between the heating source and the heat reducer, it is also proposed in accordance with the invention for the cold storage unit to be positioned directly next to or even within the heat source. This makes it possible to make direct use of the cold stored in the cold storage unit in the section of the heat source, without the necessity of heat conveyor medium flow.

With preferred embodiments it is proposed that the piping system forms a closed circuit which connects the heat source and the heat reducer/heat sink to one another by means of a feed line and a discharge line. In this connection, one also talks about the so-called loop heat pipes. This type of system makes use of a drop in pressure resulting from the phase transition of the heat conveyance medium and the force of gravity. In the heating source section, the heat conveyance medium evaporates and moves to the heater reducer which is preferably positioned at a higher level geodetically. Here, the heat conveyance medium vapour condenses and gives out the condensation heat which is released in this way. The resulting condensate flows back to the heat source, driven by the force of gravity and/or the capillary effect in a special condensate line. By means of the phase change and the use of latent heat, the heat output conveyed for each flow mass is several times higher than with the conveyance of liquids or air without phase transfer. In addition, there is no requirement for any special conveyance equipment, for example in the form of a pump.

When using this type of closed circuit with a feed line and a discharge line between the heat source and the heat reducer/heat sink, it is also proposed in accordance with the invention that the cold storage unit in a special circuit is provided with a special piping system. It is thus possible to provide a cold storage-free piping system between the heat source and the heat reducer and an additional piping system between the heat source and the heat reducer which has a cold storage unit. In order to make better use of the force of gravity, it is also proposed in accordance with the invention, that when the aircraft is in rest position, the heat reducer/heat sink is positioned at a higher level geodetically than the cold storage unit and the heat source.

It should be pointed out that the cooling system described above can be used to the opposite effect. It is, therefore, possible to use the cooling system for the general conveyance of heat, ie. for example to expel the heat from the aforementioned heat sources and to use this to heat individual aircraft components.

As well as the aforementioned advantages, another particular advantage of the invention is that the heat source and the heat reducer/heat sink can be uncoupled from one another, and can be connected with a higher level of variability by means of the flexibly located, sealed piping system, in particular the closed pipe. Moreover, there is no requirement for any active components such as blowers or pumps in the heat conveyance route because, as a result of the phase transition, the heating medium can more or less convey itself from the heat source to the heat reducer—due to the given diffusion gradient and/or the force of gravity—, and following condensation in the heat reducer/heat sink section—essentially as a result of capillary effects and/or the force of gravity—flows back to the heat source. This can be supported by the fact, for example, that there is a slight incline between the heat reducer and the heat source. This makes it possible to operate the cooling system without the need for any additional energy, for example to drive pumps, and also without any additional parasitic heat damage, for example from the operational heat of a conveyance pump. In addition, because additional active components are avoided, the reliability of the system is increased and maintenance costs are reduced. Moreover, unnecessary noise emissions, for example the noises arising from the powering of active components, can be prevented.

The invention also relates to a method for the expulsion of heat from a heat source located inside an aircraft to a heat sink, whereby a piping system sealed against the surrounding atmosphere and which is thermally coupled to the heat input section with the heat source, and which is thermally coupled to the heat output section with the heat sink, and which preferably has an essentially adiabatic transport section, is filled with a heat conveyance medium which, when it takes in heat from the heat source in the heat intake section, undergoes a transition from the liquid phase to the gaseous phase, then flows into the heat output section, and here, when heat is discharged to the heat sink, condenses again and flows back into the heat intake section.

In the following, an example of the invention is described with reference to the attached figures.

Figure 1:
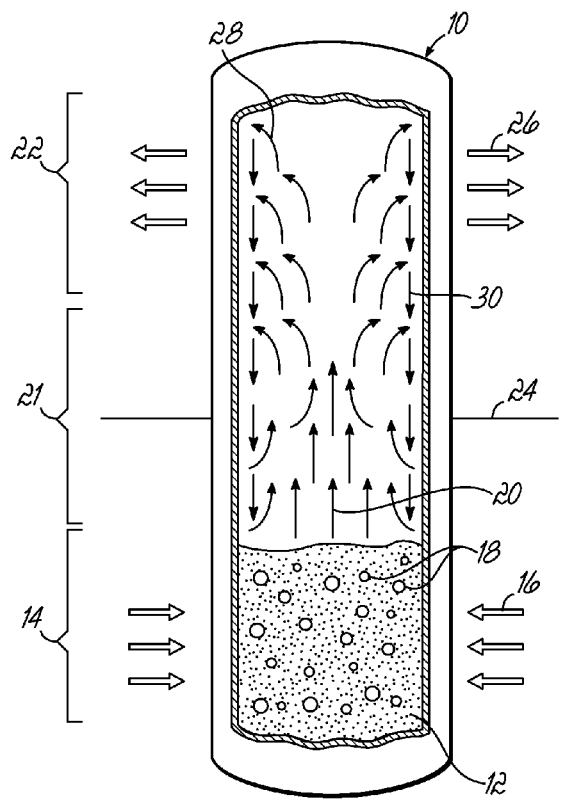
FIG. 1 shows a schematic view of a closed piping system used within the frame work of this invention.

In FIG. 1 a container in the form of a piping system, for use with a cooling system in accordance with the invention, is illustrated, partly as a section, and identified in general by 10. The container contains a circular cylindrical pipe, the faces of which are closed. In the lower section of the container, a heat conveyance medium 12 is shown in the liquid phase.

The lower section 14, which will also be identified in the following as the heat input section 14, of the container 10 is in thermal contact with a heat source, whereby—as shown by the arrow 16—heat from the heat source passes into the heat input section 14 of the container 12. This heat in accordance with the arrows 16 causes the heat conveyance medium 12 to boil, as shown by the bubbles 18 in the heat conveyance medium 12, and it finally evaporates, as shown by the vertical, upwards pointing arrows 20 in FIG. 1.

The heat conveyance medium vapour rises to the top of the container 10 via a conveyance section 21 and passes from the heat intake section 14 to a heat output section 22, whereby it crosses a transition section 24 between the heat intake section 14 and the heat output section 22.

In the heat output section 22, the container 10 is in thermal contact with a heat reducer, by means of which, in accordance with the arrows 26, heat is expelled from the heat conveyance medium. This means that the heat conveyance medium is precipitated on the walls of the container 10 in accordance with the arrows 28, and condenses here. The condensate then flows vertically downwards in the container 10, in accordance with the arrows 30 pointing vertically downwards in FIG. 1, as a result of the force of gravity, and this collects again in the liquid phase for renewed heat intake.

In the container 10, therefore, the intake of heat in accordance with the arrows 16 in the heat intake section and the output of heat in accordance with the arrows 26 in the heat output section independently generates a heat conveyance medium circuit with phase transition from the liquid phase in accordance with reference number 12 to the gaseous phase in accordance with reference numbers 20 and 28. In this way, both the perceptible heat of the heat conveyance medium and the latent heat, ie. the heat stored in the heat conveyance medium during a phase transition, are used to convey heat from the heat intake section 14 to the heat output section 22. In the heat output section 22, this latent heat is released again by condensation of the heat conveyance medium vapour. Overall, effective heat conveyance is achieved with relatively little weight caused by filling the container 10.

Figure 2:
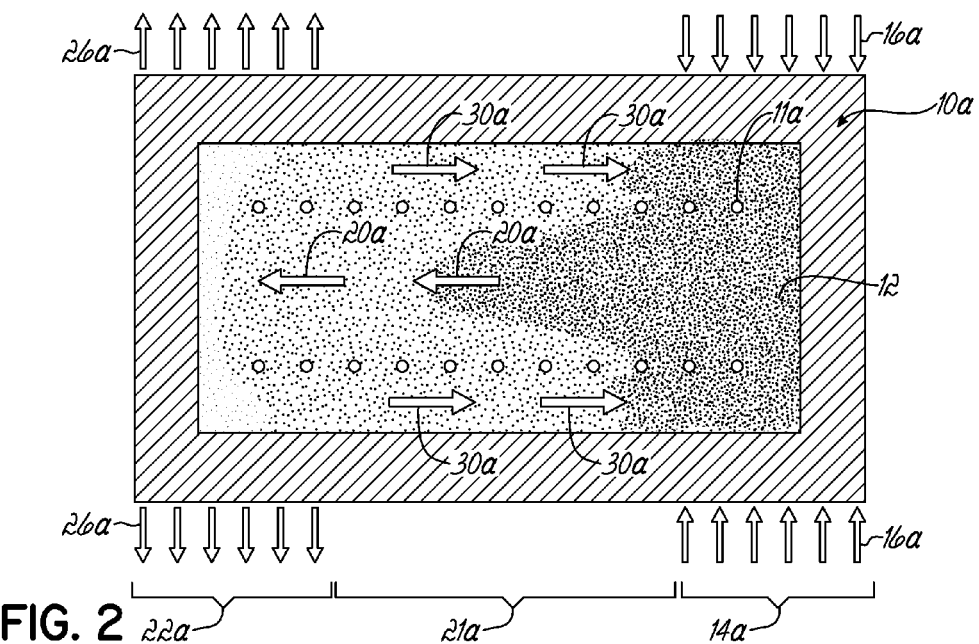
FIG. 2 shows a modified schematic view of a piping system in the form of a closed pipe used within the framework of this invention.

FIG. 2 shows a system similar to FIG. 1, but whereby a capillary effect is used rather than the force of gravity. Arrows 16a represent the intake of heat, and arrows 26a represent the outflow, or expelling, of heat. For this, a capillary structure 11a is set up within the pipe 10a, and this extends essentially in parallel to the length of the pipe 10a. On the inside of the capillary structure 11a, the heat conveyance medium evaporates in the heat intake section 14a, whereby there is a flow of vapour to the left, in accordance with the arrows 20a in FIG. 2.

In the heat output section 22 the heat conveyor medium condenses again so that there is a return flow in accordance with the arrows 30a outside of the capillary structure along the long walls of the pipe. As with the system of FIG. 1, the heat intake section 14a removes heat shown by arrows 16a and the heat output section 22a delivers heat shown by arrows 26a. FIG. 2, on the other hand, shows the heat intake section 14a as an evaporation zone, and the conveyance section 21a and the heat output section 22a as a condensation zone. The liquid conveyance results from a capillary effect and pressure equalisation.

Figure 3:
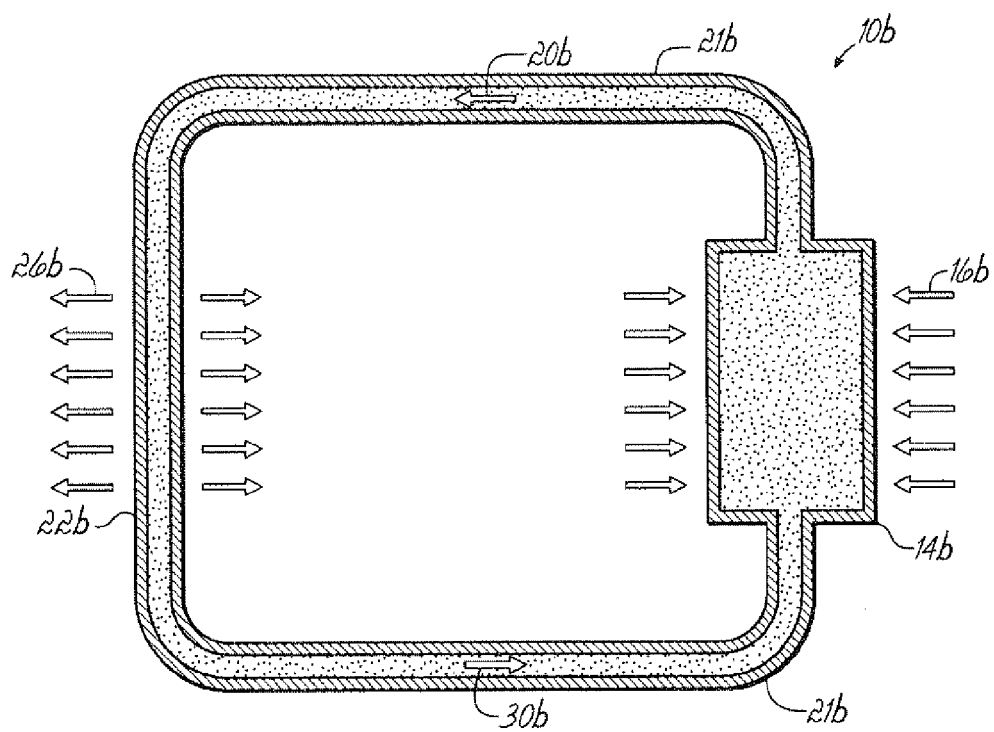
FIG. 3 shows a further modified version of the piping system in accordance with the invention in the form of a closed circuit with separate feed and discharge lines.

FIG. 3 shows another variation of the container 10b, or piping system in accordance with the invention. Arrows 16b represent the intake of heat, and arrows 26b represent the outflow, or expelling, of heat. In the example the piping system 10b is in the form of a closed circuit 10b with a conveyance section 21b including a feed line and a discharge line between the heat intake section 14b and the heat output section 22b. With impulsion from the given drop in pressure and the force of gravity, the evaporated heat conveyance medium in the heat intake section 14b is conveyed to the heat reducer in the heat output section 22b, in accordance with the arrow 20b. If the temperature is sufficiently low here, the evaporated heat conveyance medium condenses and so discharges the condensation heat which is released as shown by arrows 26b. The resulting condensate flows over the condensate line back to the heat intake section, driven by the force of gravity, in accordance with the arrow 30b. Then the condensed heat conveyance medium evaporates with intake of heat shown by arrows 16b. With the system in accordance with FIG. 3 one talks of a loop heat pipe (LHP).

Figure 4:
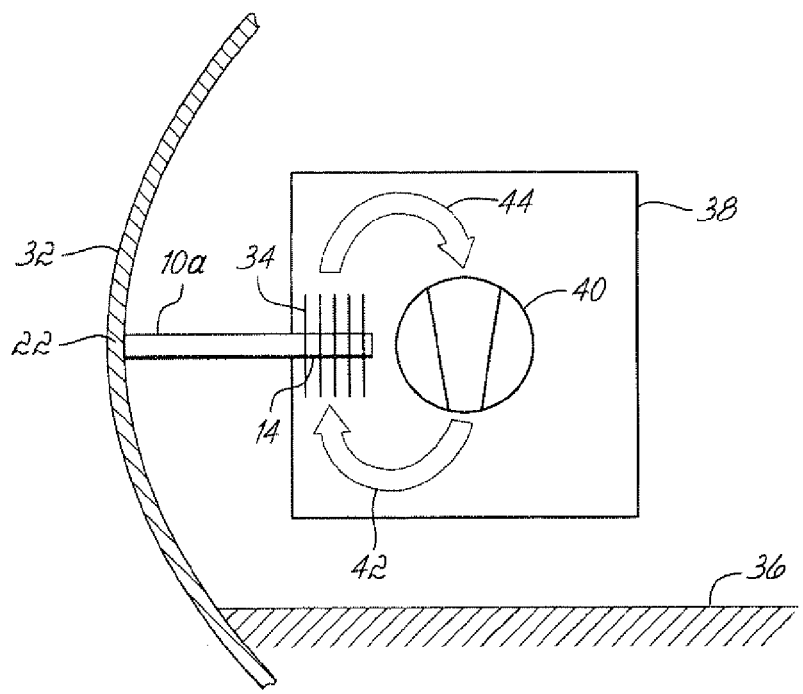
FIG. 4 shows a schematic view of an example of a cooling system in accordance with the invention.

FIG. 4 shows a possible application for the piping system 10a in an aircraft. In detail, the piping system 10a in FIG. 4 is coupled with an outer skin 32 of a commercial aircraft by means of its heat output section 22, whereby the outer skin 32 is at least largely non-insulated in the vicinity of the heat output section 22. In its heat intake section 14, the piping system 10 is provided with a number of ribs 34 which extend the surface of the heat intake section, and so facilitate better heat transfer.

In addition, in FIG. 4 there is a device requiring cooling 38 located on a cabin floor 36, for example a fridge for an on-board kitchen (galley), which has an internal ventilator 40. The ventilator 40 circulates air within the device requiring cooling so that a warm flow of air 42 is conveyed to the heat intake section 14 and gives out heat to this, and a cold flow of air 44 is conveyed away from the heat intake section 14 by means of the ventilator 40.

With the invention it is possible to cool the device requiring cooling 38 at relatively low technical cost. Because the container 10, as already described above, is in the form of a pipe and so requires only a small amount of space, the device to be cooled 38 can be positioned more or less anywhere within the aircraft without the level of cooling being effected or prejudiced to any extent by the positioning of the device requiring cooling 38. In particular it should be pointed out, as clearly shown by FIG. 4, that the device requiring cooling 38 is largely uncoupled from the outer skin 32 of the aircraft acting as a heat reducer, and is only connected by means of the pipe 10.

Figure 5:
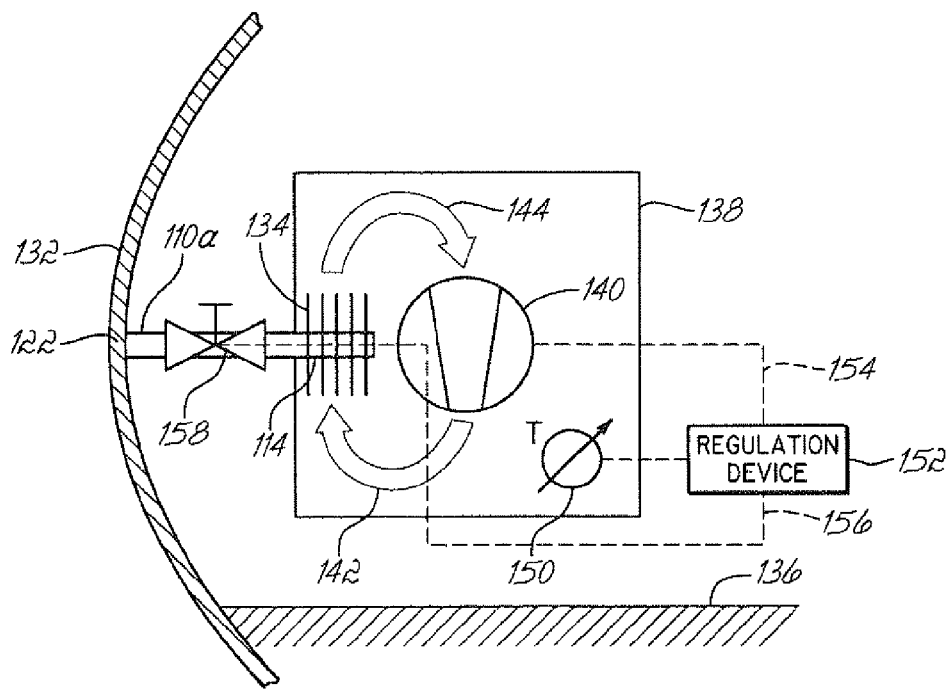
FIG. 5 shows a second version in accordance with the invention, modified in relation to FIG. 4, with a regulation device.

FIG. 5 shows a form of the invention which is modified in relation to FIG. 4. In order to simplify the description and to avoid repetition, the same reference numbers as used in the description for FIG. 4 will be used for components of the same type or used to the same effect, but with the FIG. "1" placed in front.

The embodiment in accordance with FIG. 5 is different from the embodiment in accordance with FIG. 4 in that components for the regulation of the cooling system in accordance with the invention are also provided. In particular, there is a temperature sensor 150 in the device to be cooled which is coupled directly with a regulation device 152, and so passes the temperature values recorded onto the regulation device. In addition, the regulation device 152 is coupled with the ventilator 140 by means of a control line 154 for control of the same. Moreover, the regulator 152 is coupled by means of another control line 156 with an adjustable regulator valve or thermostat valve 158.

The system in accordance with FIG. 5 works as follows. The temperature in the device to be cooled 138 is determined by means of the temperature sensor 150 and communicated to the regulator 152. If the temperature in the device to be cooled 138 is too high, the regulator 152 controls, for example, the ventilator 140 by means of the control line 154 so that the revolutions per minute of the same is increased. In this way, the circulation of the air flow 142, 144 is also increased so that a larger quantity of heat is transferred by means of the heat exchanger 134 from the device to be cooled 138 to the heat transfer medium. As an addition or as an alternative to this, the regulator 152 by means of the control line 156 controls the regulator valve 158, by means of which the flow of heat conveyance medium can be controlled. In this way it is possible to allow a larger amount of heat conveyance medium to flow through the piping system 110a, and so also to increase the amount of heat carried away from the device to be cooled 138.

In one application whereby ice can form in the heat exchanger section 134, the regulation device 152 can also be used specifically to defrost the heat exchanger 134.

Figure 6:
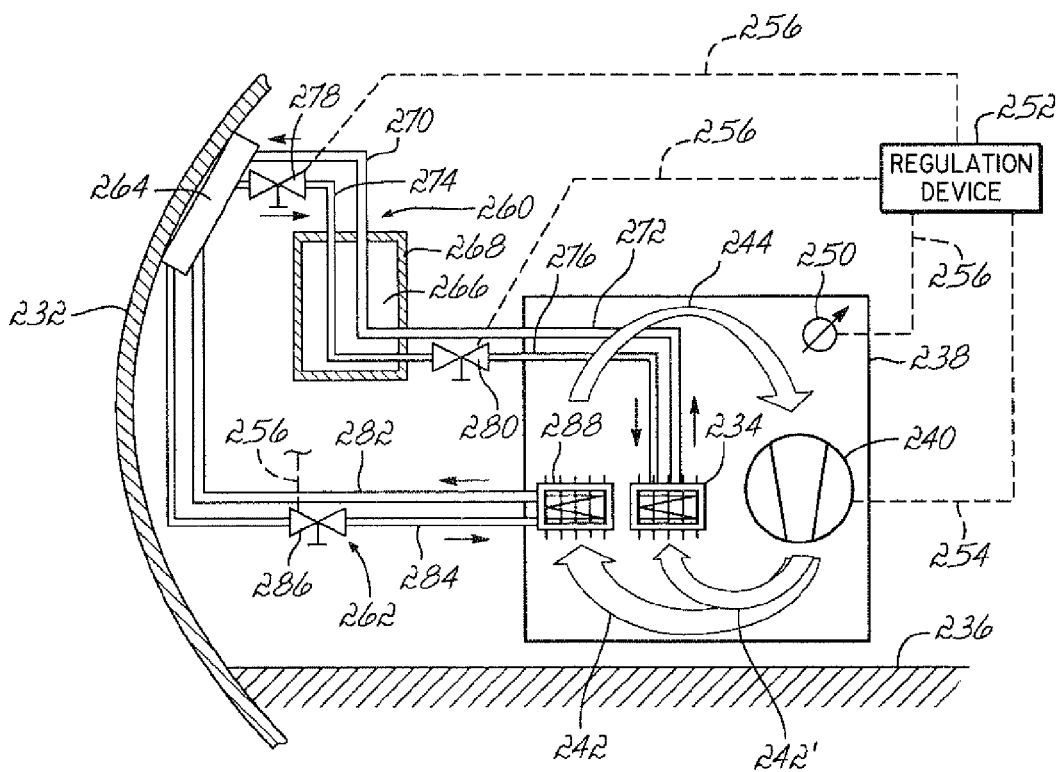
FIG. 6 shows a schematic view of a third example of a cooling system in accordance with the invention.

FIG. 6 shows another embodiment of the invention. Once again, the same reference numbers are used as previously in the descriptions for FIGS. 4 and 5 for components of the same type or used to the same effect, but with the FIG. "2" placed in front.

FIG. 6 shows that the device to be cooled 238 is connected to the outer skin 232 of the aircraft by means of two circuits 260 and 262. For this, a coupling device 264 is used which helps with the thermal coupling of the two circuits 260 and 262 to the outer skin 232.

In the first circuit 260 a cold storage unit 266 is provided which has a thermally insulating wall 268. The circuit 260 is designed with a first connection line 270, 272 over which the evaporated heat conveyance medium flows from the heat exchanger 234 to the coupling device 264. In addition, the first circuit includes two reverse lines 274, 276, along which the condensed heat conveyance medium can flow back to the heat exchanger 234. Controllable devices regulator valves 278, 280 are provided in these reverse lines 274, 276.

The second circuit 262 includes a supply line 282 and a reverse flow line 284, whereby in the latter there is, once again, a controllable regulator valve 286. The second circuit 262 connects the coupling device 264 with the heat exchanger 288.

The system in accordance with FIG. 6 functions as follows. In order to cool the device to be cooled 238 during normal operation, ie. during the flight operation of the aircraft, the second circuit 262 is essentially used. This works as described above with reference to FIGS. 4 and 5, ie. there is an intake of heat in the device to be cooled 238 and this heat is conveyed away by means of the condensed heat conveyance medium by means of the line 282 to the coupling device 264. Here, the heat is discharged to the cold external skin 232, whereby the heat conveyance medium condenses and flows back to the heat exchanger 288 via the reverse flow line 284. Again the regulation device 252 is operatively coupled to the ventilator 240 via control line 254, to the temperature sensor 250, and to the regulator valves 278, 280, 286 via control lines 256. The quantity of heat transferred by the flow of air 242 can be changed by altering the revolutions per minute of the ventilator 240 and by setting the regulator valve 286.

In addition to this system, circuit 260 is provided which includes the cold storage unit 266. The cold storage unit 266 serves to provide sufficient cold for situations in which the cooling provided by the circuit 260 is insufficient. For this, during normal operation in the circuit 260, the valve 280 remains closed, whereas the valve 278 is opened. In this way the cold storage unit 266 can be loaded, whereby the heat conveyance medium is cooled and stored in the storage unit 266 in condensed form. If there is an increased cold requirement, for example when the aircraft is on the ground and it is not possible to provide cooling by means of the outer skin 232, the regulator valve 278 can be shut and the regulator valve 280 opened so that there is a flow of heat conveyance medium through the circuit 260 and the device to be cooled 238 can be by using the additional flow of air 242' generated by the ventilator by means of the condensed heat conveyor medium stored in the cold storage unit 266.

It should be noted that with the embodiment in accordance with FIG. 6, the average temperature level of the cold storage unit 266 must lie between that of the device to be cooled 238 and that of the heat reducer 264.

It is also pointed out that in the application according to FIG. 6, the heat reducer, ie. the coupling device 264 should be geodetically higher than the cold storage unit 266, and this in turn should be geodetically higher than the heat source, ie. the heat exchanger 234. This facilitates a reverse flow of liquid brought about by the force of gravity, and improves the overall heat conveyance performance.

It should finally be noted that the heat exchangers 234 and 288 in the device to be cooled can have parallel or serial flow in relation to the air flow 242 or 242'.

Figure 7:
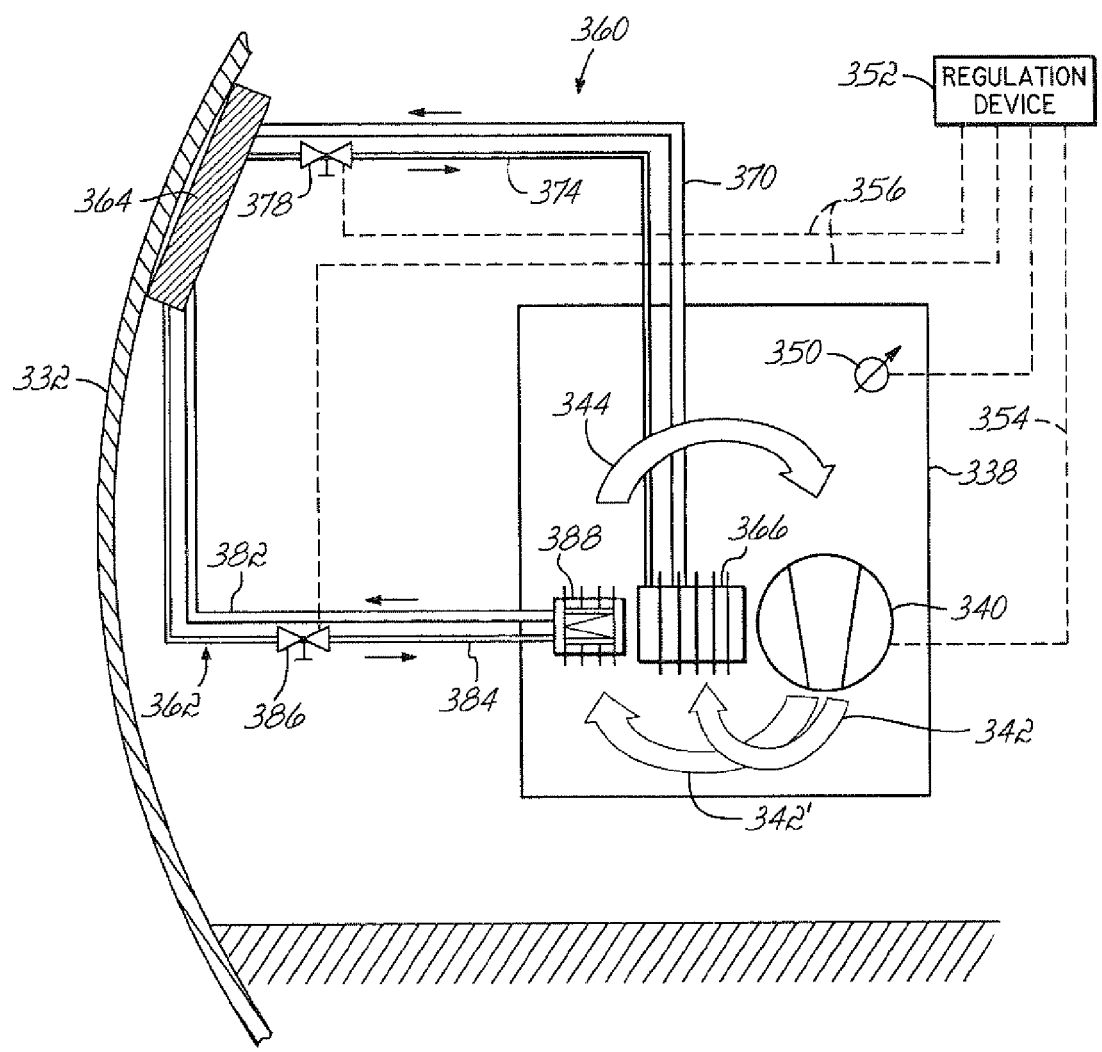
FIG. 7 shows a schematic view of a fourth example of the cooling system in accordance with the invention.

FIG. 7 shows a simplified embodiment in relation to FIG. 6. Once again, the same reference numbers are used for components of the same type or used to the same effect as in the description for FIG. 6, but with the FIG. "3" placed in front.

The embodiment in accordance with FIG. 7 differs from the form in accordance with FIG. 6 in that the cold storage unit 366 is positioned inside the device to be cooled 338. This means that, during operation, the cold conveyance medium stored inside the cold storage unit 366 can discharge its cold directly to the device to be cooled 338 without a flow of heat conveyance medium being necessary. This can happen, for example, by means of natural convection or with a special ventilator. Alternatively, it is also possible for a flow of air via the ventilator 340 to be conveyed either to the cold storage unit 366 or to the heat exchanger 388, dependent upon the operation in question. For example, during normal operation, when the aircraft is in the air and the outer skin 332 can be used as a heat reducer, the device to be cooled 338 is cooled by the circuit 362, whereas when the aircraft is on the ground and the outer skin 332 can not serve as a heat reducer because of the high external temperatures, circuit 360 is used for cooling.

The invention claimed is:

1. Aircraft having a cooling device for expelling heat from a heat source located in the interior of said aircraft to a heat sink, comprising:
   a first piping system sealed against the surrounding atmosphere, the first piping system having a heat intake section thermally coupled with the heat source, a heat output section thermally coupled with the heat sink, and an essentially adiabatic conveyance section located therebetween, whereby the first piping system is filled with a heat conveyance medium which, when heat is received in the heat intake section from the heat source, undergoes a transition from the liquid phase to the gaseous phase, then flows into the heat output section, then condenses when discharging heat to the sink, and then flows back to the heat intake section, wherein said heat sink includes a section of an external wall of the aircraft;
   at least one heat exchanger which operatively couples the first piping system to the heat source, thereby to cause heat transfer in the heat intake section;
   a ventilator operatively connected to said at least one heat exchanger, the ventilator adapted to control the transfer of heat between said at least one heat exchanger and the heat source;
   a temperature sensor located adjacent the heat source so as to detect the temperature thereof, the temperature sensor operatively connected to the cooling device so that the cooling device can respond to the temperature detected by the temperature sensor;
   a cold storage unit provided between the heat source and the heat sink, the cold storage unit collecting cooled liquid phase heat conveyance medium for use when cooling requirements are increased, such as when the aircraft is on the ground; and
   a second piping system sealed against the surrounding atmosphere, the second piping system having a heat intake section thermally coupled with the heat source and a heat output section thermally coupled with the heat sink, whereby the cold storage unit is located in a secondary closed circuit defined by the second piping system.

2. Aircraft in accordance with claim 1, whereby the heat source includes at least one of the following components: an electronic device in the aircraft, an on-board kitchen in the aircraft, and a surface requiring cooling in the aircraft.

3. Aircraft in accordance with claim 1, whereby the piping system forms a closed circuit which connects the heat source and the heat sink via a feed line and a discharge line, respectively.

4. Aircraft in accordance with claim 1, whereby when the aircraft is in rest condition, the heat sink is located geodetically higher than the cold storage unit, which is further located geodetically higher than the heat source.

5. Method for the discharge of heat from a heat source located in the interior of an aircraft to a heat sink, the aircraft including a first closed piping system sealed against the surrounding atmosphere, the first piping system having a heat intake section thermally coupled to the heat source, a heat output section thermally coupled to the heat sink, and an essentially adiabatic transport section located therebetween, the first piping system being filled with a heat conveyance medium which, when heat is taken from the heat source in the heat intake section, undergoes a transition from the liquid phase to the gaseous phase, then flows into the heat output section, then condenses as heat is discharged to the heat sink again and then flows back into the heat intake section, wherein the aircraft includes a cold storage unit provided between the heat sink and the heat source in a second piping system sealed against the surrounding atmosphere, the second piping system having a heat intake section thermally coupled with the heat source and a heat output section thermally coupled with the heat sink, wherein the heat sink includes a section of an external wall of the aircraft, comprising:
   causing, via at least one heat exchanger which operatively couples the first and second piping systems to the heat source, heat transfer in the heat intake section;
   controlling, via a ventilator, the heat transfer between the at least one heat exchanger and the heat source;
   controlling, via a regulator valve disposed between the heat intake section and the heat output section, the quantity of heat conveyance medium flowing to and from the at least one heat exchanger;
   storing cooled liquid phase heat conveyance medium in the cold storage unit while the aircraft is flying; and
   releasing stored liquid phase heat conveyance medium from the cold storage unit to the heat source when the aircraft has an increased cooling requirement, such as when the aircraft is on the ground.

\* \* \* \* \*